March 24, 1931.          W. S. WHITING, JR          1,797,628
AUTOMATIC TOASTER
Filed April 26, 1929          2 Sheets-Sheet 1
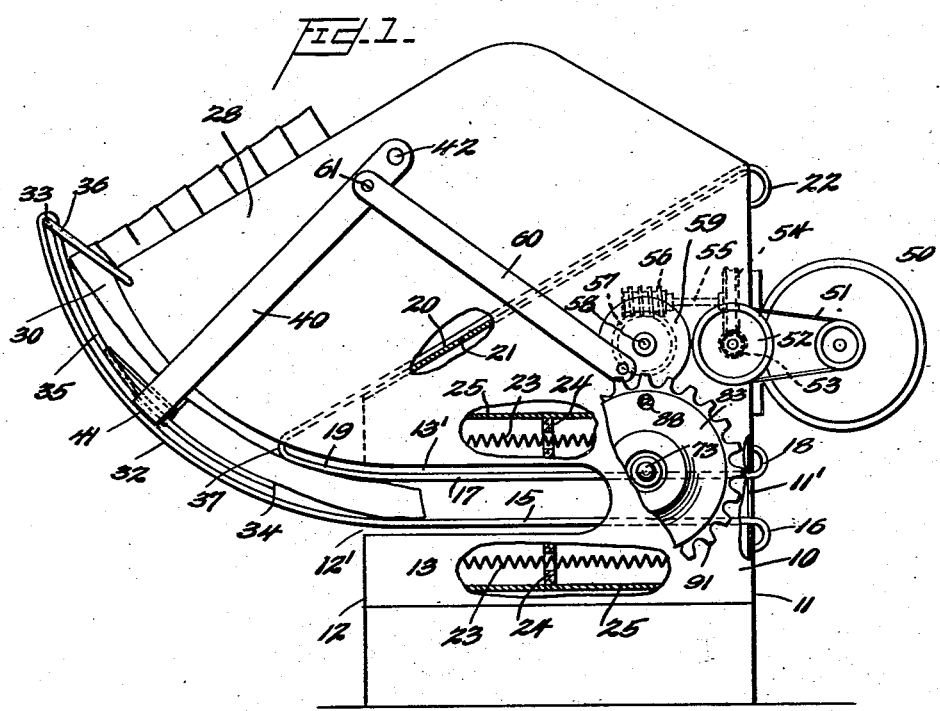
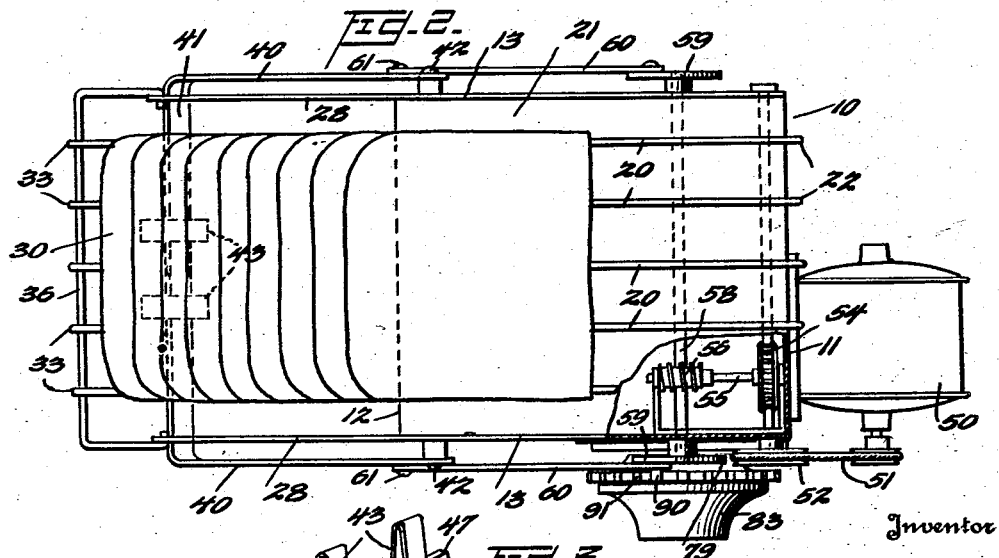
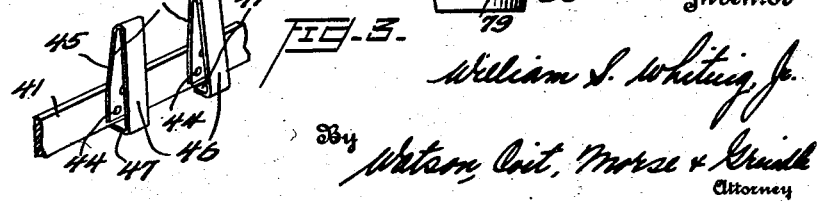

March 24, 1931. W. S. WHITING, JR 1,797,628
AUTOMATIC TOASTER
Filed April 26, 1929 2 Sheets-Sheet 2
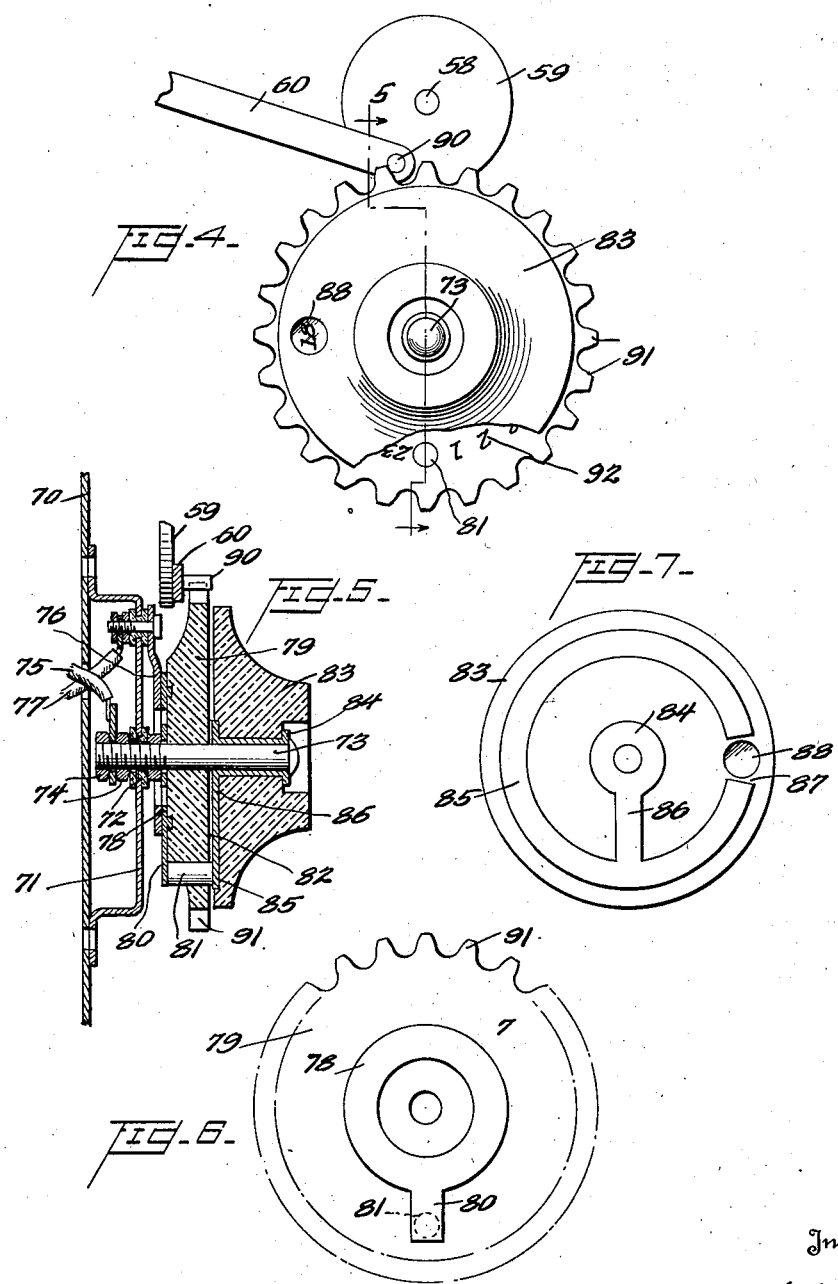

Patented Mar. 24, 1931

1,797,628

UNITED STATES PATENT OFFICE

WILLIAM S. WHITING, JR., OF TROY, NEW YORK

AUTOMATIC TOASTER

Application filed April 26, 1929. Serial No. 358,406.

This invention relates to toasters and more particularly to automatic electric toasters.

It is a general object of the present invention to provide a novel and improved form of automatic electric toaster. More particularly, it is an object of the invention to provide in a toaster, electrical toasting elements, a support for a stack of slices to be toasted and means for intermittently feeding slices one at a time from the stack to the toasting elements so that succeeding slices discharge those previously toasted and take their place. Among the novel features of the invention may be enumerated the following:

1. The use of automatic intermittent feed with succeeding slices discharging toasted ones.

2. The removing of slices from the bottom of a stack so that gravity automatically feeds the succeeding slices in the stack into position for transfer to the toasters.

3. The use of an arcuate transfer channel between the stack and the toasting position so that a simple oscillating pusher may be used.

4. The provision of means whereby the pusher may return beneath the stack without moving the bottom slice.

5. The use of an automatic switch actuated by the slice feed mechanism whereby any predetermined desired number of slices may be toasted automatically and the machine then shut off.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims without departing from the spirit of the invention.

In said drawings:

Figure 1 is a side elevation with certain parts broken away to show the construction of interior parts;

Figure 2 is a plan view of the toaster;

Figure 3 is a perspective view of the pushers;

Figure 4 is an enlarged side elevation showing the switch and its operating mechanism;

Figure 5 is a vertical section on the line 5—5 of Fig. 4;

Figure 6 is a view of the rear face of one of the switch disks; and

Figure 7 is a rear view of the cooperating face of the other switch disk.

Briefly, the invention as disclosed in the drawings comprises a pair of spaced toasting surfaces between which slices of bread are adapted to be intermittently fed from a stack by a pusher which is timed so that each slice remains between the toasting surfaces just sufficiently long to be properly toasted and is then discharged by a succeeding slice taking its position between the surfaces. The whole is driven by a small electric motor which not only actuates the feeding mechanism, but also operates a switch which is stepped around one notch for each slice fed so that the machine can be set to toast the desired number of slices and then stop.

In the drawings there is disclosed at 10 the main portion of the device which is substantially square in horizontal section and composed of sheet metal side members forming a box-like structure. Midway between the top and bottom of this casing the front and rear plates 11 and 12 are provided with openings 11' and 12' somewhat larger than the cross-section of a slice of toast, and the side plates 13 are provided with the slots 13' extending horizontally from the opening 12'. This forms a passage clear through the casing from front to rear which is lined at the bottom with a series of wire guides 15 which are bent over as at 16 and have their ends secured to the front plate 11. The guide wires 17 at the top are bent over as at 18 and secured to the front plate and at 19 extend beyond the opening 12 and are then bent back and extend as at 20 over the sloping upper plate 21 forming the top closure for the casing. At the front end of this plate they are bent downwardly as at 22 and secured to the front plate. Above and below the channel or passageway provided between the guide wires 15 and 17 is arranged a suitable electrical heating element, preferably composed of a plurality of helices 23 of suitable resistance wire which can be conveniently supported in perforated insulators 24. On the far side of each heating element from the passageway between the guide wires is arranged a reflecting plate 25 to reflect the heat toward the toast which is on the guide wires.

Conveniently the length from front to rear of the casing is just slightly greater than that of a slice of bread, but the width may be equal to that of one or any number of slices in accordance with the desired capacity of the machine. The machine illustrated has a capacity of but one slice of toast at a time and is therefore just slightly wider than a slice of bread.

The inclined guide wires 20 form a sloping surface on which a stack of slices of bread is adapted to be supported, conveniently guided between side plates 28 which may be integral extensions from the side plates 13 of the main casing 10. The bread is adapted to be stacked in the trough thus formed with the plane of the slices substantially normal to the plane of the guide surface formed by the wires 20. The lowest slice 30 of the stack rests on the returned portions 35 of the arcuate extensions 32 of the lower guide wires 15 where they extend to the rear of the casing. Conveniently these wires extend out as shown in the form of a true arc starting at the opening 12' and extending up beyond the edges of the side plates 28. They are then bent back on themselves toward the inner side of the arc as at 33 and run along parallel to their main portions to the point 34 where they stop. These inner parts 35 are the true supports for the lower slice of bread. For the sake of stiffness and rigidity, the loops 33 may be tied in by a wire 36 to the corners of the side plates 28. The return bends 37 between the portions 19 and 20 of the upper guide wires are spaced above the ends 34 of the guide wires 35 just a distance equal to the thickness of a slice of bread so that if the bottom slice is pushed, it passes between the wires 34 and 19, and the slice next above it is held against moving by engaging the bends 37.

To transfer the slices successively from the stack to the position between the toasting elements, use is made of a U-shaped member having the side arms 40 and the bottom connecting member 41. The arms are pivoted as at 42 to the side plates 28 at the center of the arc formed by the wires 32, 35 and the connecting member 41 for the arms 40 passes between the wires 32 and 35.

As seen in Fig. 3, the member 41 is provided with a plurality of spring pushers 43 which consist of straps of spring metal with their ends riveted to the member 41 as shown at 44 and extending rearwardly as at 45, then bent back upon themselves to form the flat upper portions 46. The forward ends of the portions 46 are turned down forming the true pushing faces 47 which just clear the front edge of the member 41. These faces 47 engage the edge of a slice of toast as clearly shown in Fig. 1, when the arms 40 are retracted and transfer it from the stack to a position between the toasting elements. These pushers, as seen in Fig. 2, are spaced between the wires 35 with the sharp bends of the pushers below the level of the wires 35 and with the faces 46 inclined upwardly therefrom. On the return stroke of the member 41, the faces 46 slide beneath the next slice of bread which has fallen into position by gravity due to the weight of the slices above it in the tray, and since these pushers are resilient, the parts 46 are bent down so that the whole readily passes beneath the slice. Even if these pushers are of rigid material, operation will not be impaired for the slices will merely be lifted to make way for the returning pushers. The stroke of the pushing assembly is arranged such that it leaves a slice centrally positioned in the toasting compartment, and its speed is such that on its return, the slice is toasted and ready to be discharged when movement is imparted to the next slice which follows in behind the slice just toasted and discharges it through the opening 11' into any suitable receptacle, its place being taken by the next slice, and so on.

Motive power is supplied conveniently by means of a small electric motor 50 which, through the belt 51, drives a pulley 52 having on its shaft the worm 53 operating on the worm wheel 54 on the shaft 55. A worm 56 on the shaft 55 drives the worm wheel 57 on the shaft 58 which extends between the side members 28 of the bread trough. Conveniently, a crank or a disk 59 is arranged at each end of this shaft 58 outside of the plates 28. Links 60 are pivoted at one end to the disks 59 and at the other end to the arms 40 at 61, which points are so positioned that each full revolution of the disks 59 carries the arms 40 from a position with the pushers just above the lower slice of toast to a position to leave this slice properly between the toasting elements. The speed of the motor can be regulated by a suitable speed regulating mechanism of ordinary form and hence not illustrated, so that toast of the desired color can be obtained.

It is desirable to be able to fill the tray with slices and to be able to set the machine to run until a desired number of slices has been toasted, which number has no relation to the number in the tray, except, of course, that it must be equal to or less than that number. This can be accomplished by the switch mechanism shown in Figs. 1 and 4 to 7. In Fig. 5, 70 represents one of the side plates of the main part of the machine, and there can be seen a part of the disk 59 which drives the link 60. A suitable bridge member 71 is secured by rivets to this plate 70 and has an opening 72 in which is mounted a headed stud 73 suitably insulated therefrom by the washers shown and positioned by means of the nuts 74. It may have one conductor 75 leading to the motor and heat elements electrically attached thereto, as clearly shown. Secured to but insulated from the bridge member 71 is the spring 76 to which the other conductor 77 is secured. The end of this spring is preferably in the form of an annulus extending around and clear of the stud 73 and engaging at all times a contact ring 78 set into the back of a disk 79 of insulating material rotatably mounted on the stud 73. Extending loosely through this disk and in contact with a tongue 80 on the conductor 78 is the brush or contact member 81 which preferably protrudes slightly from the front face 82 of this disk 79. Also pivoted to the stud 73 is the knob 83 formed of insulating material and having a metal bushing 84 in electrical engagement with the stud 73. In Fig. 7 is seen the rear face of this knob which has set in it the arcuate contact member 85 connected by means of the strap 86 with the bushing 84 so that it is also in electrical engagement with the stud. This arcuate contact member is at the same radial distance from the center as is the brush 81 and is adapted to be engaged by the brush, as shown in Fig. 5. It has a portion slightly greater than the diameter of the brush removed, as shown at 87, and conveniently there is an aperture at this point with a glass 88 therein having its inner face flush with the face of the knob and the contact 85. It will be seen from the above description that when the brush 81 is in engagement with the contact arc 85, current can flow through the switch from the wire 75 through the stud 73, strap 86, the contact arc 85, the brush 81, contact ring 78 and the spring 76 to the wire 77. However, if the brush is in engagement with the glass 88, the circuit is broken.

The disk 79 is adapted to be stepped around by the extended pivot 90 on the disk 59 and arranged to drive the link 60. As shown in Fig. 4, the disk 79 is toothed as at 91 and is so related in respect to the pivot 90 that for each revolution of the disk 59, the pivot engages a tooth and moves it through the distance between two teeth. In other words, the disk 79 will be rotated through a full revolution when the disk 59 makes as many revolutions as there are teeth on the disk 79. The disk 79 carries on its face 82 a circular series of indicia 92, conveniently numbers running from 1 to the maximum slice capacity of the machine, which numbers are visible through the glass 88 in the knob 83 when they are positioned beneath it as shown in Fig. 4.

The operation of the switch will now be evident. The knob 83 which has close frictional engagement with the stud is rotated manually until the number appears through the glass 88 which corresponds to the desired number of slices of toast. When the machine is started, at the completion of each slice, the disk 79 is moved one notch, and the next lower number appears below the glass 88 so that for each slice toasted, the switch is moved one tooth toward open position which is just after the number one has appeared beneath the glass 88 when the circuit is opened both to the motor and to the heating element and the whole machine stopped. By the use of this type of switch it is not necessary to set back the disk controlled by the machine in order to fix the number of slices to be toasted, but it is only necessary to rotate the knob until the proper number appears through its opening. This, of course, is based on the machine having been stopped by the automatic switch.

Having thus described the invention, what is claimed as new and desired to be secured by Letters Patent is:

1. In an automatic toaster, in combination, a slice guiding and supporting surface, means at one end of said surface to retain a stack of bread slices with the lower one resting on said surface, means at the other end of said surface to toast a bread slice, a member mounted for reciprocation along said surface to push adjacent slices from the bottom of said stack to said toasting position and means to drive said member.

2. In an automatic toaster, in combination, a slice guiding and supporting surface, means at one end of said surface to retain a stack of bread slices with the lower one resting on said surface, means at the other end of said surface to toast a bread slice, a member mounted for reciprocation along said surface to push adjacent slices from the bottom of said stack to said toasting position and means to drive said member at such a speed as to leave each slice at the toasting position until properly toasted when it is dislodged by the succeeding slice.

3. In an automatic toaster, in combination, a slice guiding and supporting surface, means at one end of said surface to retain a stack of bread slices with the lower one resting on said surface, means at the other end of said surface to toast a bread slice, a member mounted for reciprocation along said surface to push adjacent slices from the bottom of said stack to said toasting position, a pusher on said member adapted to engage the edge of a slice to push it and means whereby said pusher may return beneath the next bottom slice without moving it.

4. In an automatic toaster, in combination, a slice supporting grid, heating means on opposite sides of said grid, an arcuate extension from one end of said grid, the far end of said extension forming a rest for the bottom slice of a stack, a trough for said stack spaced slightly more than the thickness of one slice from said rest, an arm pivoted at the center of said arc, a pusher on said arm to engage the rear edge of the slice on said rest and means to reciprocate said arm so that the pusher moves from the position of engaging said slice on said rest to a position where the slice is deposited on said grid after which said pusher returns to its original position.

5. In an automatic toaster, in combination, a slice supporting grid, heating means on opposite sides of said grid, an arcuate extension from one end of said grid, the far end of said extension forming a rest for the bottom slice of a stack, a trough for said stack spaced slightly more than the thickness of one slice from said rest, an arm pivoted at the center of said arc, a pusher on said arm to engage the rear edge of the slice on said rest, means to reciprocate said arm so that the pusher moves from the position of engaging said slice on said rest to a position where the slice is deposited on said grid after which said pusher returns to its original position and means to permit said pusher to pass beneath the next bottom slice on said return.

In testimony whereof I hereunto affix my signature.

WILLIAM S. WHITING, Jr.